United States Patent
Huang (10) Patent No.: US 7,661,435 B2
(45) Date of Patent: *Feb. 16, 2010

(54) PUMP CONNECTOR FOR PRESTA VALVE

(76) Inventor: Ying-Che Huang, No. 111, Lane Tzeng-Fu, Tzeng-Tsuo Tsuen, Shiou-Shuei Shiang, Chang-Hua Hsien, 504 (TW)

( * ) Notice: Subject to any disclaimer, the term of this patent is extended or adjusted under 35 U.S.C. 154(b) by 99 days.

This patent is subject to a terminal disclaimer.

(21) Appl. No.: 11/744,227

(22) Filed: May 4, 2007

(65) Prior Publication Data

US 2008/0271789 A1 Nov. 6, 2008

(51) Int. Cl.
*F16K 15/20* (2006.01)
(52) U.S. Cl. ........................ 137/231; 137/223
(58) Field of Classification Search .......... 137/223, 137/231, 232; 251/149.1, 149.4; 285/354
See application file for complete search history.

(56) References Cited

U.S. PATENT DOCUMENTS

| | | | | |
|---|---|---|---|---|
| 406,060 A * | 7/1889 | Potts | ........................ | 285/354 |
| 582,460 A * | 5/1897 | Cottrell et al. | ............ | 137/232 |
| 587,613 A * | 8/1897 | Schlager | ................. | 251/149.4 |
| 659,081 A * | 10/1900 | Lloyd | ........................ | 137/232 |
| 1,299,398 A * | 4/1919 | Kahn | ........................ | 137/231 |
| 2,149,681 A * | 3/1939 | Johnston | ..................... | 137/231 |
| 4,017,057 A * | 4/1977 | Strybel | .................... | 251/149.1 |
| 5,762,095 A * | 6/1998 | Gapinski et al. | ............ | 137/223 |
| 5,819,781 A * | 10/1998 | Wu | ............................. | 137/231 |
| 5,975,105 A * | 11/1999 | Chang | ......................... | 137/45 |
| 5,983,920 A * | 11/1999 | Gapinski et al. | ............ | 137/231 |
| 6,073,645 A * | 6/2000 | Wu | ............................. | 137/231 |
| 6,076,544 A * | 6/2000 | Pierce | ........................ | 137/223 |
| 6,102,063 A * | 8/2000 | Pierce et al. | ................ | 137/231 |
| 6,105,601 A * | 8/2000 | Wang | ......................... | 137/231 |
| 6,220,836 B1 * | 4/2001 | Wu | ............................. | 137/231 |
| 6,250,603 B1 * | 6/2001 | Knowles et al. | .......... | 251/149.1 |
| 6,260,572 B1 * | 7/2001 | Wu | ............................. | 137/231 |
| 6,276,391 B1 * | 8/2001 | Wu | ............................. | 137/223 |
| 7,309,034 B2 * | 12/2007 | Huang | ........................ | 239/589 |
| 7,588,048 B2 * | 9/2009 | Huang | ........................ | 137/231 |
| 2007/0272301 A1 * | 11/2007 | Huang | ........................ | 137/231 |

* cited by examiner

*Primary Examiner*—John Rivell
*Assistant Examiner*—Craig Price

(57) ABSTRACT

Pump connector for Presta valve is disclosed in which one end of a pump connector valve seal is formed with a hollow chamber, and is disposed inside a space of a cap having a channel. The hollow chamber is assembled with a valve seal insert which includes a through hole. The second end of the through hole is formed with an inner edge corresponding to the shape of the shoulder section of the Presta valve. An end cap is assembled with the cap for preventing the pump connector valve seal from separating from the cap. Accordingly, the Presta valve can be screwed together with a first internal thread of the cap, and at the same time the shoulder section of the Presta valve is tightly fitted to the inner edge of the valve seal insert for direct inflation.

2 Claims, 7 Drawing Sheets

PUMP CONNECTOR FOR PRESTA VALVE

BACKGROUND OF THE INVENTION

1. Field of the Invention

The present invention relates to a pump connector specially designed for inflating a Presta valve.

2. The Prior Arts

Generally, an inflating valve is disposed on an air-inflatable object, such as on the tyre of vehicles, etc. Before inflation, an inflating connector disposed on an air hose or a pump connector of an air pump is connected with the inflating valve on the inflatable object, and then the air pump can be operated to inflate the inflated object using pressurized gas.

Commonly, the air inlet of an inflating valve is set up with a poppet valve. As the external force is not being applied on the poppet valve, the air pressure inside the inflated object can ensure the inflating valve to be in the closed condition for preventing the air in the inflated object from escaping. As the external force is applied on the poppet valve, the poppet valve can be opened, and the interior of the inflated object is then communicated with the exterior, thereby discharging the air inside the inflated object, or allowing the air outside the inflated object to be inflated into it.

Figure 6:
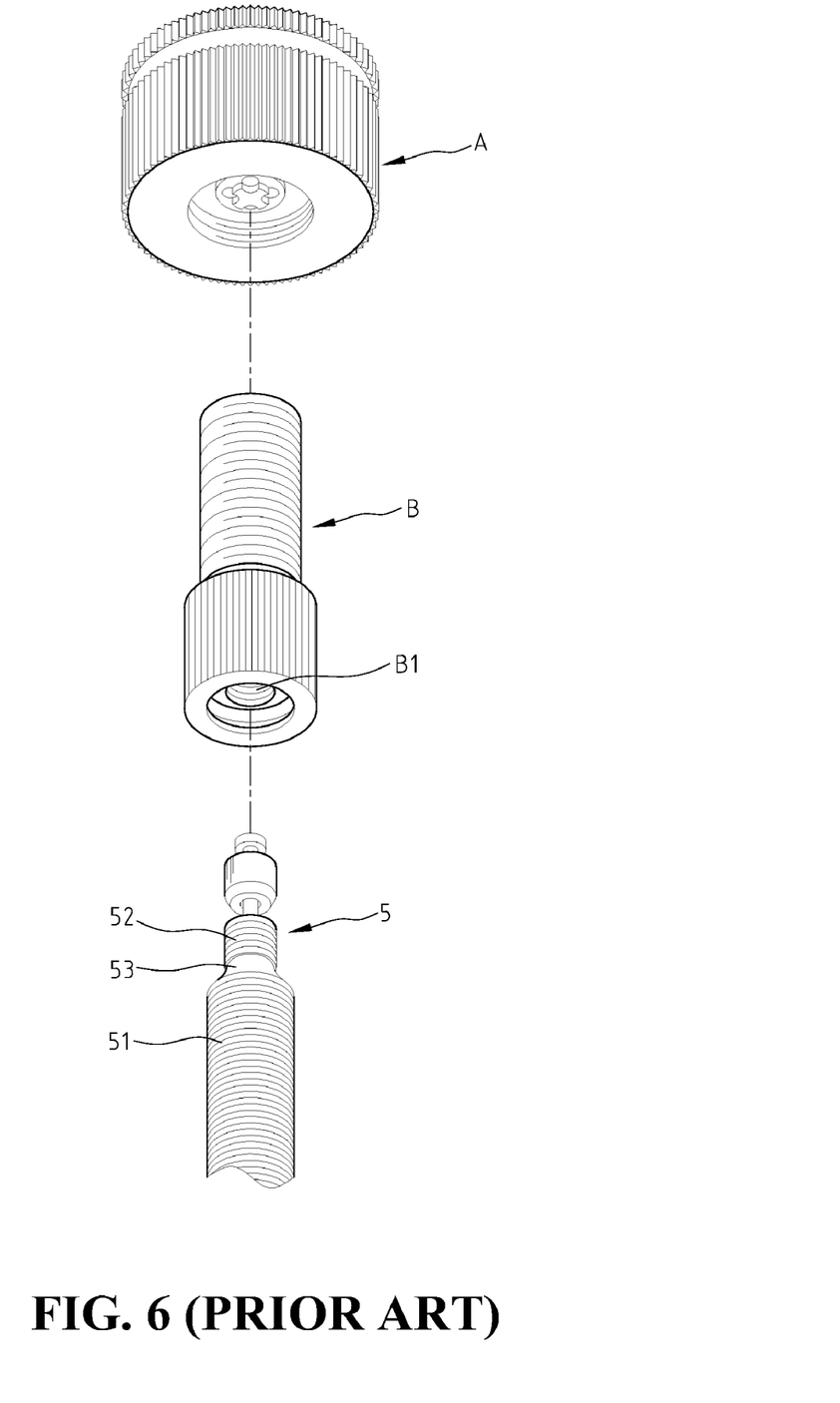
FIG. 6 is a 3D exploded view of a conventional pump connector requiring an adapter for inflation.
Figure 7:
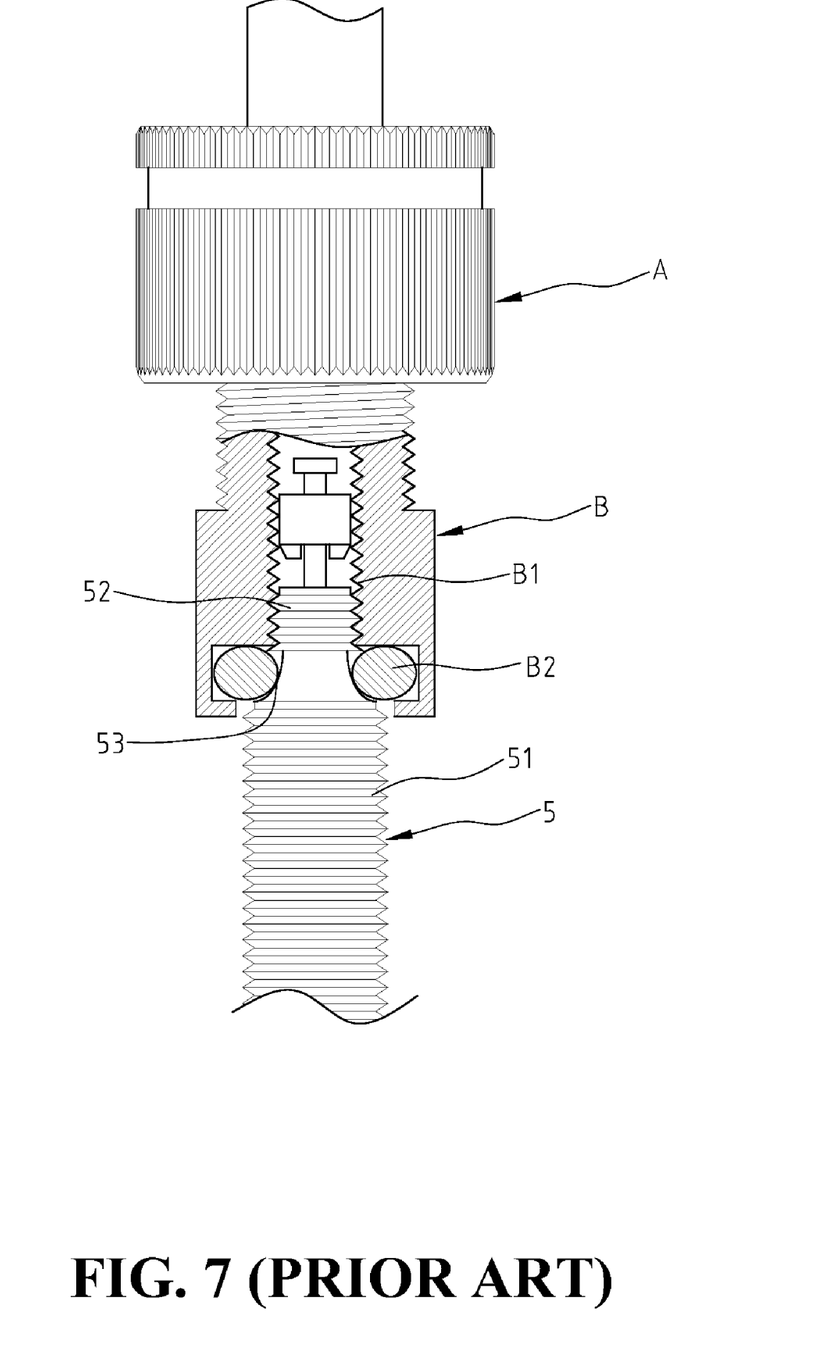
FIG. 7 is a plane cross-sectional view showing the structure of the conventional pump connector and a Presta valve after assembly.

Moreover, as there are many types of inflating valves nowadays, a Presta valve, for example, has a different structure from the typical inflating valve. With reference to FIG. 6, a Presta valve 5 includes a two-stage thread, which includes a first external thread 51 having a larger outside diameter and a second external thread 52 having a smaller outside diameter, and which is closer to the free end. Also, a shoulder section 53 is formed between the first external thread 51 and the second external thread 52. Because no pump connector specially-matched with the Presta valve is available in the market today, an adapter B must be assembled to a conventional inflating valve A and to be simultaneously screwed with the second external thread 52 of the Presta valve 5 by using an internal thread B1 formed on the adapter B (with reference to FIG. 7) for inflating a Presta valve. Furthermore, to prevent the gas from escaping, an anti-leak gasket B2 must be disposed within the inside diameter of the adapter B, so the anti-leak gasket B2 is enclosed at the shoulder section 53 of the Presta valve as the adapter B is screwed with the Presta valve 5.

SUMMARY OF THE INVENTION

An objective of the present invention is to forego the conventional pump connector in which an adapter must be assembled with the conventional inflating valve for inflating a Presta valve, which as a result, has an inconvenient inflating operation.

A main objective of the present invention is to provide a pump connector designed for a Presta valve, which is of a simpler configuration, and includes fewer parts, and is able to be used on a Presta valve for air inflation.

A main feature of the present invention is to provide a pump connector valve seal which can accommodate a valve seal insert. After the valve seal insert is assembled with the pump connector valve seal, they are together disposed into a cap and an end cap. Also, the valve seal insert includes a leakage-proof structure for sealing the Presta valve, so that the pump connector can be provided to inflate the Presta valve specifically.

One of the technical features of the present invention is that the pump connector valve seal is fabricated by machining or one-piece construction, where one end of which is formed with an end section having a larger diameter than the opposite end section, as well as including a hollow void for accommodating the valve seal insert. Furthermore, the side wall of the end section is to provide the isolation function by being positioned in between the valve seal insert and the inside diameter of the cap, so that negative effect upon the rotational capability of the cap due to the contact between the valve seal insert made in plastic material and the cap made in metal material can be avoided.

Another technical feature of the present invention is that after the valve seal insert is securely fitted inside the hollow void of the pump connector valve seal, a through hole of the valve seal insert and an air hose of the pump connector valve seal can be aligned in a straight line. Furthermore, the through hole can be provided for the Presta valve to be inserted into. During gas inflation, the gas pressure can press the poppet valve of the Presta valve to open automatically so that the gas can be inflated into the inflated object.

Another technical feature of the present invention is that the edge of the through hole of the valve seal insert is formed with an inner edge corresponding to the shape of a shoulder section of the Presta valve 5. Therefore, as the Presta valve 5 is fittingly engaged with the pump connector for air inflation, the inner edge can be tightly abutted close to the shoulder section for preventing the gas from escaping.

The pump connector comprised of the above parts according to the present invention can provide inflation directly to a Presta valve; and the Presta valve does not need to be assembled to an adapter as is the case for the conventional pump connector; therefore, the pump connector of the present invention is more convenient for inflation usage.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Reference will now be made in detail to embodiments of the present invention, examples of which are illustrated in the accompanying drawings. The present invention will be apparent to those skilled in the art by reading the following detailed description of a preferred embodiment and the skilled can operate it according to the reference.

Figure 1:
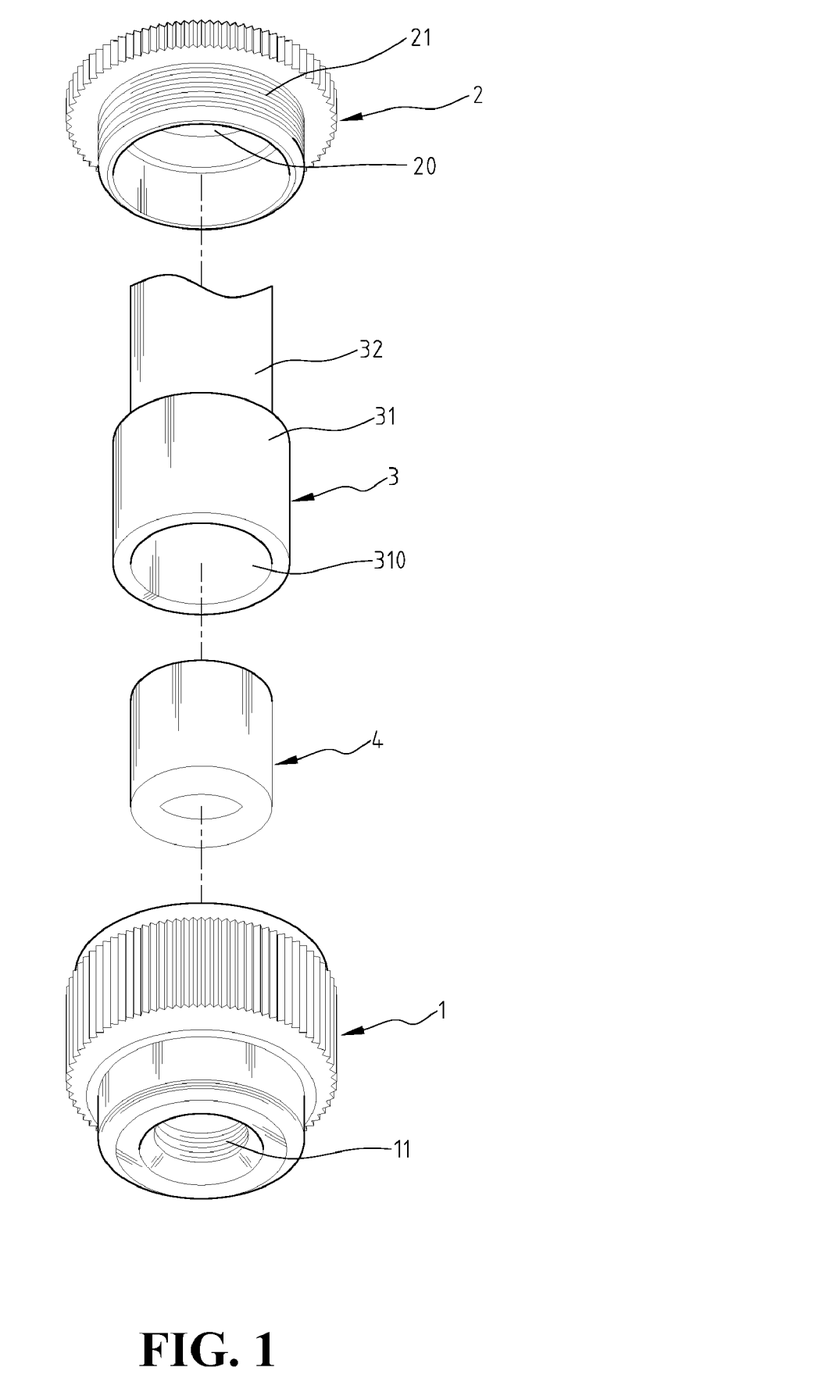
FIG. 1 is an exploded view of a preferred embodiment of a pump connector according to the present invention, which shows the assembling relationship of a plurality of main parts of the pump connector.
Figure 2:
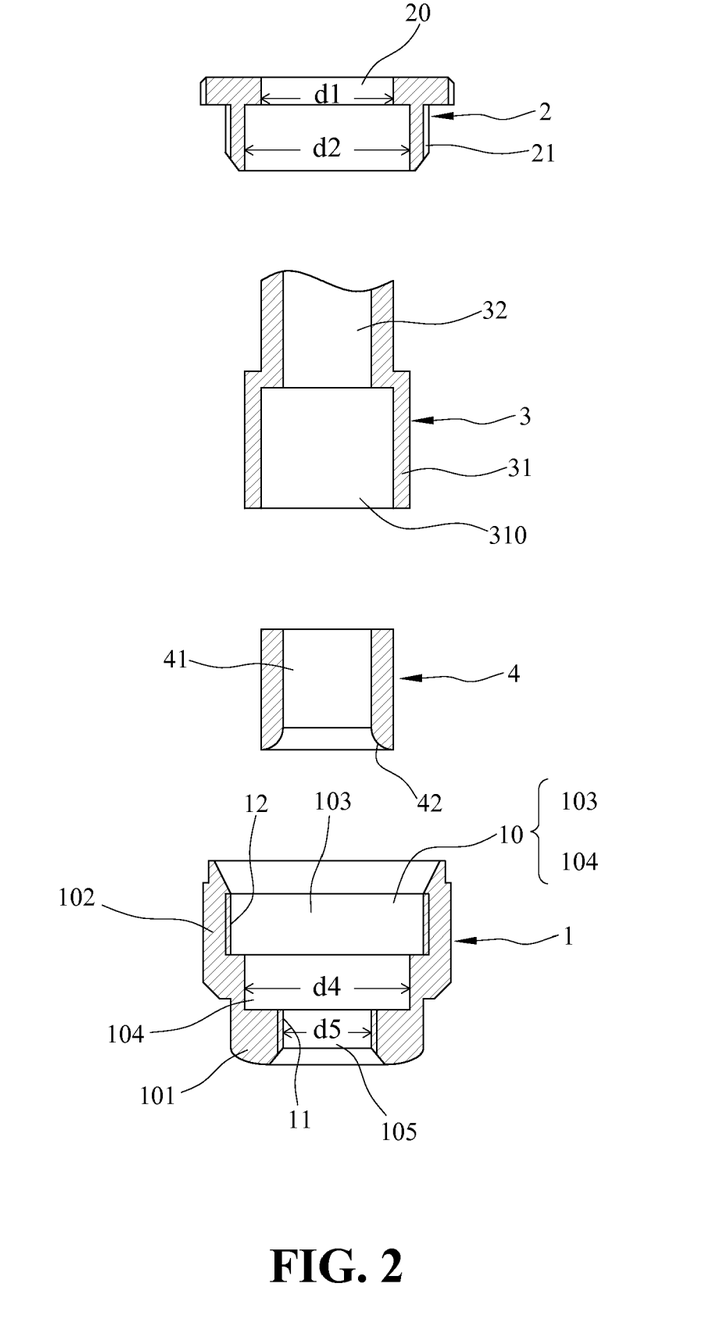
FIG. 2 is a plane cross-sectional exploded view of the parts shown in FIG. 1.

With reference to FIG. 1 and FIG. 2, a preferred embodiment of a pump connector according to the present invention includes a cap 1, an end cap 2, a pump connector valve seal 3, and a valve seal insert 4. All of the above-described parts each include a first end and a second end, in which each of the first ends is defined as having the same direction, and each of the second ends is defined as having a direction opposite to the first end.

Also, the cap 1 can be made from any material, but metal is the most preferred material, in consideration of the strength and hardness factor of metal. The first end 101 of the cap 1 is formed with a channel 105, and whose inside circumference is formed with a first internal thread 11, which can be screwed with a first external thread 51 of a Presta valve 5 (in FIG. 3). Furthermore, the second end 102 of the cap 1 is formed with a space 10, which is communicated with the channel. Moreover, the space 10 is divided into an upper section 103 and a middle section 104; and the inside circumference of the space 10 at the upper section 103 is formed with a second internal thread 12.

The first end of the end cap 2 is formed with an external thread 21, which can be matched and meshed with the second internal thread 12. Also, the center of the end cap 2 is formed with a through hole 20 passing through the first end and the second end of the end cap 2.

The pump connector valve seal 3 can be made from metal, plastic, etc, which are of materials having adequate strength and hardness. The first end of the pump connector valve seal 3 is comprised of a head section 31 with a diameter larger than that of the second end; and the end surface of the head section 31 is formed with a hollow chamber 310 in an appropriate depth. Furthermore, the outside circumference of the head section 31 is slightly smaller than the inside circumference of the space 10 of the cap 1, so that the head section 31 can be disposed in the space 10. Also, the outside circumference of the second end of the pump connector valve seal 3 is slightly smaller than the inside circumference of the through hole 20 of the end cap 2, so that the second end of the pump connector valve seal 3 is able to pass through the through hole 20. The second end of the pump connector valve seal 3 is formed with an air passage 32 communicating with the hollow chamber 310. The first end of the pump connector valve seal 3 is smaller than an inner diameter d2 of the first end of the end cap 2 but larger than the diameter d1 of the through hole of the end cap 2.

The valve seal insert 4 is made from a material having excellent leakage-proof properties, such as plastic, etc. The center of the valve seal insert 4 is formed with a through hole 41, the edge at the second end of the through hole 41 is formed with an inner edge 42 comprising an arc and corresponding to the shape of the shoulder section 53 of the Presta valve 5. The external diameter of the valve seal insert 4 is nearly equal to the internal diameter of the hollow chamber 310 of the pump connector valve seal 3. During assembly of the aforementioned elements, the first end of the valve seal insert 4 is first disposed in the hollow chamber 310 of the pump connector valve seal 3; and then the pump connector valve seal 3 together with the valve seal insert 4 are disposed inside the space 10 of the cap 1. Finally, the external thread 21 of the end cap 2 is screwed and meshed with the second internal thread 12 of the cap 1. Accordingly, the assembly of each part is completed, so that the pump connector valve seal 3 and the valve seal insert 4 are prevented from separating from the cap 1.

Figure 4:
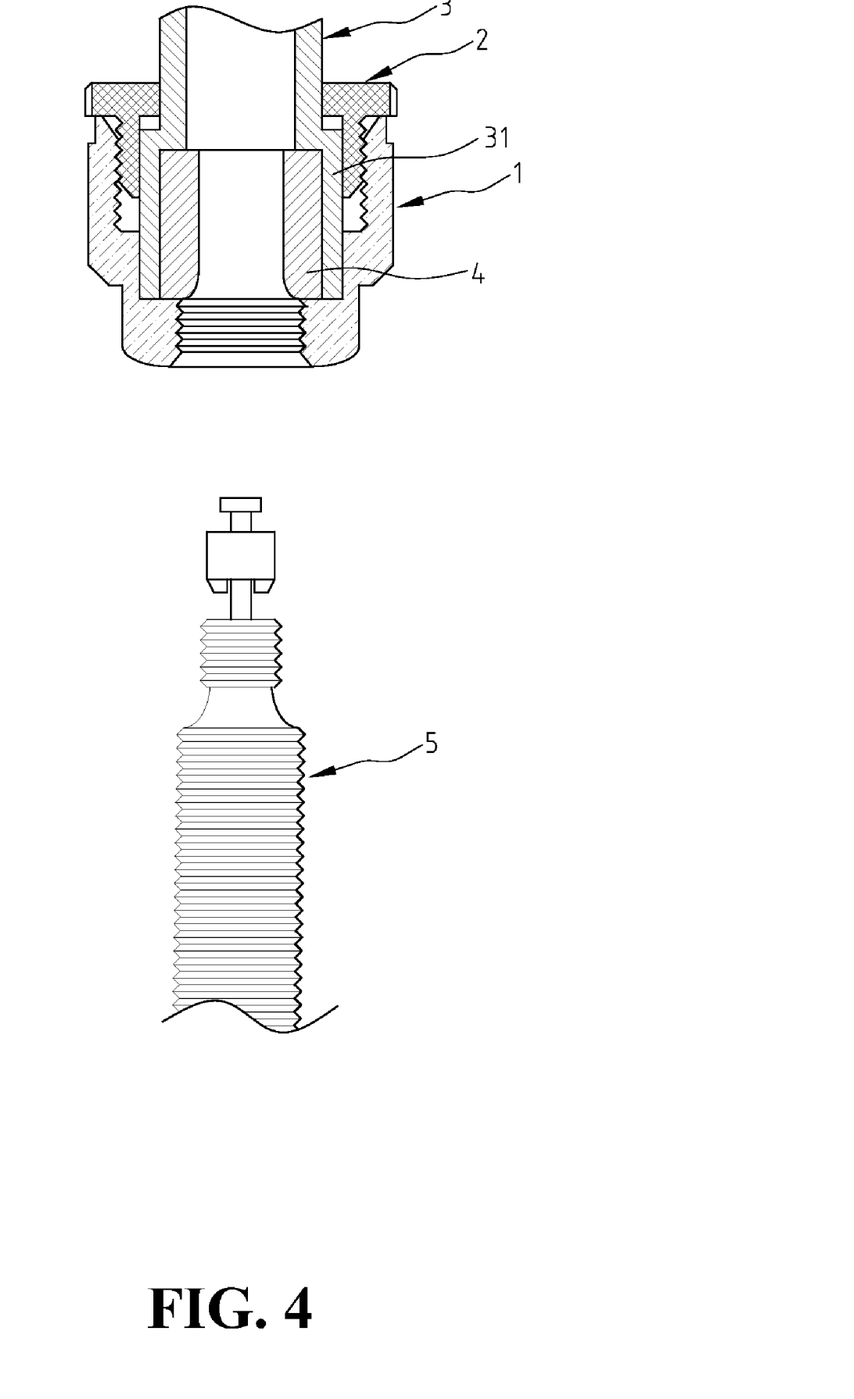
FIG. 4 is a plane cross-sectional view showing the assembling relation between the Presta valve and the pump connector according to the present invention.

As can be seen from FIGS. 2 and 4, the cap 1 is a single component with its inside being divided into three sections. The lower section of the inside is the channel 105 which is formed in the first end of the cap 1. The upper section 103 and the middle section 104 of the inside are formed in the second end of the cap 1. The thread 12 is formed on the inner wall of the upper section 103 for tightly coupling with the end cap 2. The channel at the first end is for tightly coupling with a Presta valve 5. Between the upper section 103 and the channel 105 is the middle section 104 for receiving and tightly coupling with the head section 31 of the pump connector valve seal 3. The diameter d4 of the middle section 104 is larger than the diameter d5 of the channel 105 but smaller than that of the upper section 103. The middle section 104 is formed immediately adjacent to the channel at the first end. As a result, the valve seal insert 4 is tightly retained inside the pump connector valve seal 3 which is received in the middle section 104 of the cap 1 and then retained by the end cap 2 as shown in FIG. 4.

Figure 3:
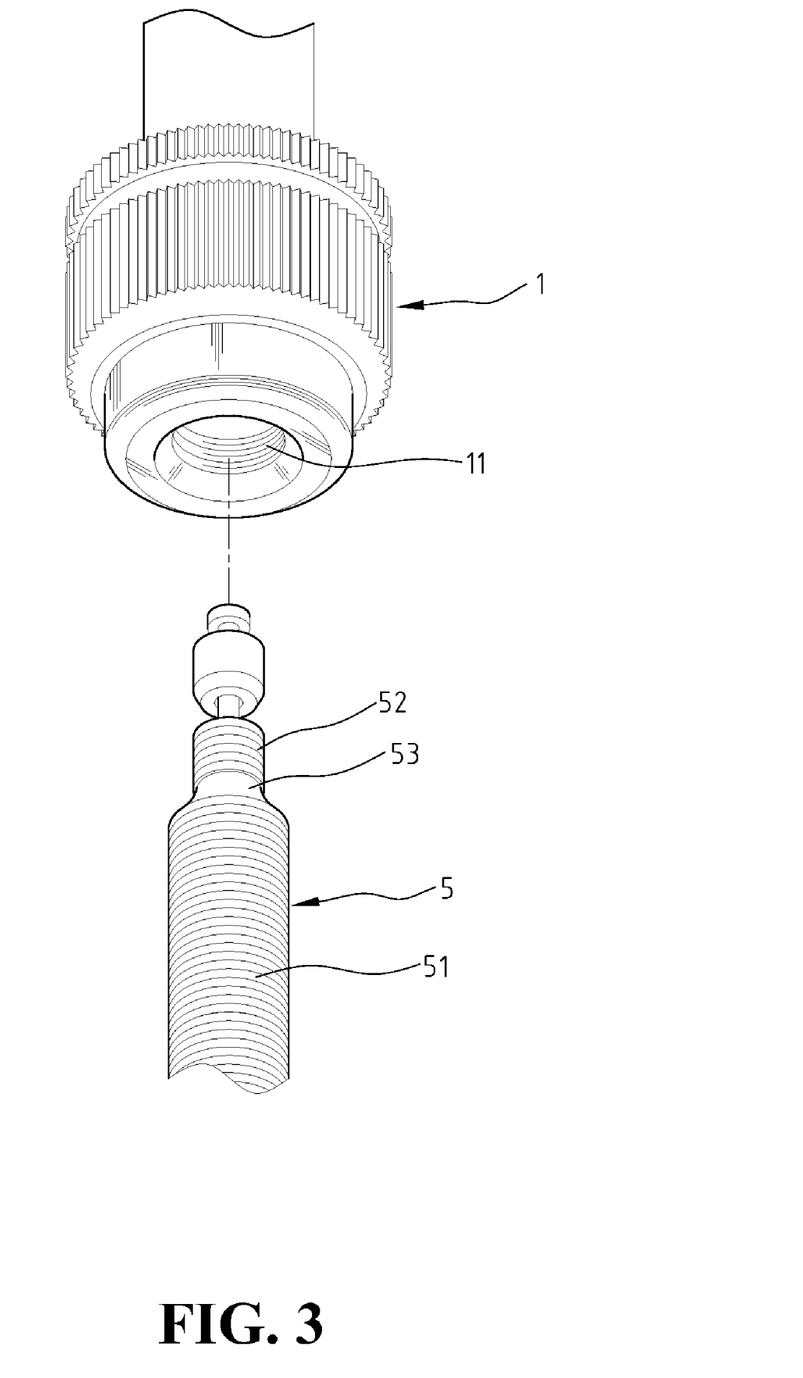
FIG. 3 is a 3D view showing the assembling relationship between a Presta valve and a pump connector according to the present invention.
Figure 5:
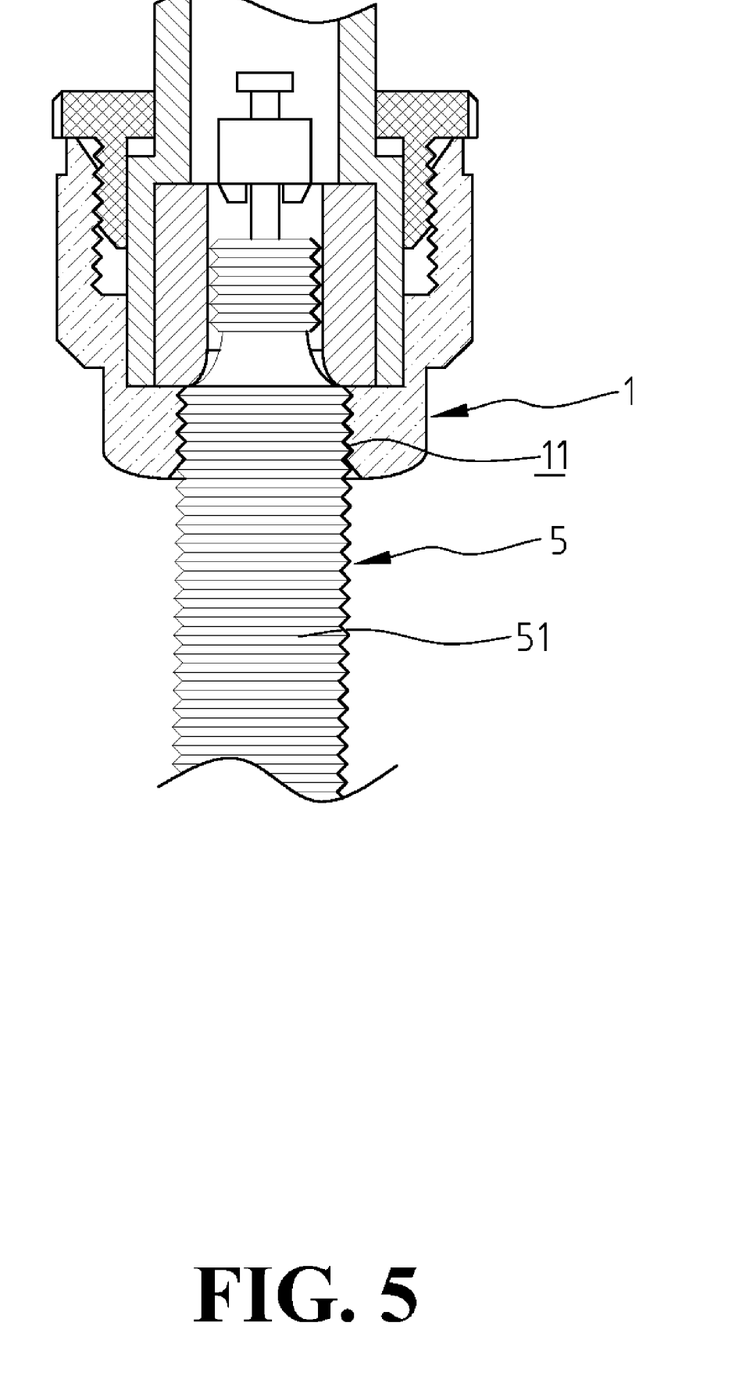
FIG. 5 is a plane cross-sectional view showing the configuration of the Presta valve and the pump connector after assembly according to the present invention.

FIG. 3 to FIG. 5 are showing an assembled pump connector according to the present invention. The side wall of the head section 31 of the pump connector valve seal 3 is positioned between the valve seal insert 4 and the inside circumference of the cap 1; and both between the head section 31 and the inside circumference of the cap 1 and between the through hole 20 of the end cap 2 and the second end of the pump connector valve seal 3 are provided a loose fit or clearance. Accordingly, when the pump connector valve seal 3 is not moving, both the cap 1 and the end cap 2 can freely rotate relative to the pump connector valve seal 3, which helps to screw the first internal thread 11 of the cap 1 with the first external thread 51 of the Presta valve 5. As shown in FIGS. 4 and 5, the shoulder section of the Presta valve is retained in the through hole of the valve seal insert 4 and the free end of the Presta valve 5 is disposed in the air passage of the pump connector valve seal 3. During inflation, the gas pressure automatically presses open the poppet valve of the Presta valve 5, so that the gas can be inflated into the inflated object.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A pump connector for a Presta valve, comprising
a valve seal insert formed with a through hole;
a pump connector valve seal having a first end formed with a hollow chamber, and a second end formed with an air passage, said first end having a diameter larger than said second end, and said hollow chamber receiving said valve seal insert and communicating with said air passage;
a cap being a single component having a first end formed with a channel, and an opposite second end formed with a space for communicating with said channel, said space being divided into an upper section and a middle section, a first internal thread being formed on an inner wall of said channel, and a second internal thread being formed on an inner wall of said upper section, said middle section being immediately adjacent and between said upper section and said channel, and said middle section having a diameter smaller than that of said upper section but larger than that of said channel; and
an end cap having a first end formed with an external thread and a second end formed with a through hole for passing said second end of said pump connector valve seal, said first end of said end cap having an inner diameter larger than said first end of said pump connector valve seal for accommodating said first end of said pump connector valve seal;

wherein said through hole of said end cap has a diameter smaller than said first end of said pump connector valve seal, said external thread is screwed with said second internal thread to enclose said first end of said pump connector valve seal between said cap and said end cap with said first end of said end cap being tightly received in said upper section and said first end of said pump connector valve seal being tightly received in said middle section, and said first internal thread is for screwing to an external thread of said Presta valve so as to retain a shoulder section of said Presta valve inside said through hole of said valve seal insert and position a free end of said Presta valve inside said air passage of said pump connector valve seal.

2. The pump connector as claimed in claim 1, wherein an inner edge of said through hole of said valve seal insert is shaped to match with the shoulder section of said Presta valve.

* * * * *